INVENTOR
E. D. GIBSON 2,983,864
Patented May 9, 1961

2,983,864

TEST CIRCUIT FOR MEASUREMENT OF GAS DIODE BREAKDOWN CHARACTERISTICS

Earl D. Gibson, Washington, D.C., assignor to the United States of America as represented by the Secretary of the Navy Filed Nov. 4, 1955, Ser. No. 545,139

9 Claims. (Cl. 324—23)

(Granted under Title 35, U.S. Code (1952), sec. 266)

The invention described herein may be manufactured and used by or for the Government of the United States of America for governmental purposes without the payment of any royalties thereon or therefor.

This invention relates to electrical test circuits for measuring certain characteristics of gas tubes, and more particularly to electrical test circuits for measuring the minute incremental variations in the levels of ignition potentials and ignition time delays of gas diodes resulting from variations in certain external factors, such as, the applied potential, impinging light intensity, radioactivity, etc., with a high degree of accuracy.

Although in the great majority of gas diode applications, these minute variations in ignition or breakdown potentials and ignition delay times are insignificant, these variations are of significance in certain military ordnance applications, such as, for example, in electric time fuzes.

Accordingly, one object of the present invention is to provide a new and improved circuit for accurately measuring the incremental variations in the ignition potential of a gas diode resulting from variations in the voltage gradient of the applied potential.

Another object of the present invention is to provide a new and improved circuit for accurately measuring the incremental variations in gas diode ignition delay times resulting from variations in the voltage gradient of the applied potential.

A further object of the present invention is to provide a new and improved electric testing circuit for accurately measuring the incremental variations in the breakdown potential level and the ignition delay time of gas diodes when subjected to an applied voltage of constant potential, i.e. zero voltage gradient.

A still further object of the present invention is to provide an electric circuit simple in design and inexpensive of construction for accurately and quickly measuring the minute incremental variations in the ignition characteristics of gas diode tubes.

Figure 1:
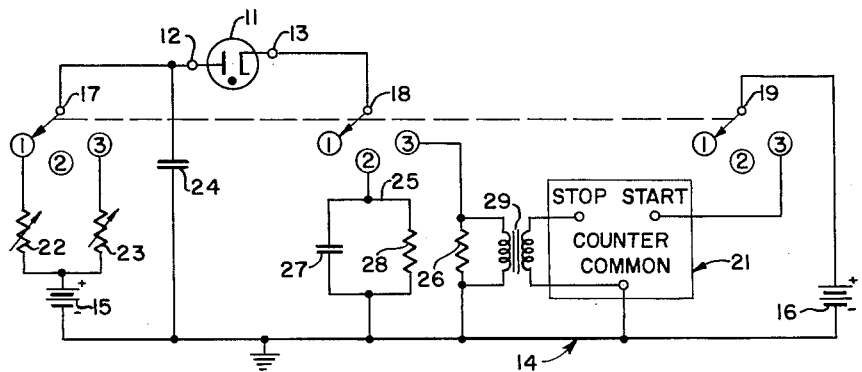
Figure 2:
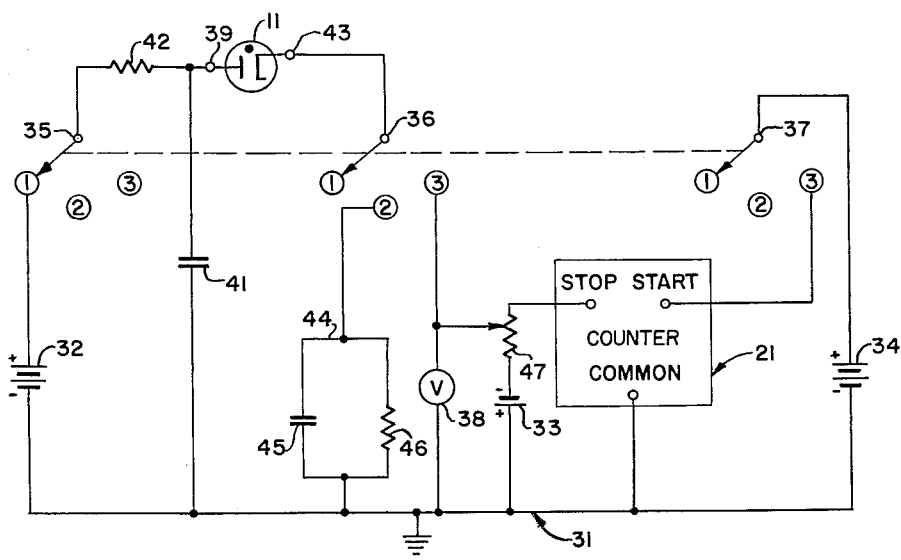

Other objects and many of the attendant advantages of the present invention will be readily appreciated as the same becomes better understood by reference to the following detailed description when considered in connection with the accompanying drawing wherein:

Fig. 1 is a schematic diagram illustrating one arrangement of the electric test circuit of the present invention; and Fig. 2 is a schematic diagram illustrating another arrangement of the electric test circuit of the present invention.

Referring now to the accompanying drawing wherein like numerals indicate like parts throughout the several views, and more particularly to Fig. 1 whereon is shown a gas diode tube 11 connected to the input terminals 12 and 13 of an electric test circuit generally indicated by the numeral 14. As shown thereon, test circuit 14 includes a pair of suitable direct current power sources, indicated by batteries 15 and 16, a plurality of non-shorting type multiple position selector switches 17, 18 and 19, ganged for mechanical movement in unison, and a counter or timer, generally indicated by the numeral 21, which counter may be any one of many conventional electronic types commercially available. Respectively connected to positions 1 and 3 of selector switch 17 are variable resistors 22 and 23, said resistors also being commonly connected to battery 15. Input terminal 12 and fixed capacitor 24 are connected to the movable wiper of selector switch 17. Individually connected to positions 2 and 3 of switch 18 are stabilizing or discharge circuit 25 and fixed resistor 26 respectively. Input terminal 13 is connected to the movable wiper of selector switch 18. Stabilizing circuit 25 consists of parallel connected capacitor 27 and resistor 28, capacitor 27 being of a much smaller capacitance than capacitor 24. Counter or timer 21 is so connected to position 3 of switch 19 as to be rendered effective, i.e. commence counting by an impulse from battery 16 upon engagement of the movable wiper of switch 19 with contact 3. The secondary winding of a step-up voltage transformer 29 is so connected to the counter 21 as to render the counter ineffective, i.e. cease counting, upon development of a voltage across the primary winding of the transformer, said primary winding being shunted across the fixed resistor 26, thereby forming a counter signal circuit.

The operation of the electric test circuit 14 is as follows. Ganged selector switches 17, 18 and 19 are initially on position 1, whereby battery 15 charges capacitor 24 through resistor 22 to a potential level above the breakdown potential level of the gas diode 11. The ganged switches are then moved to position 2 whereupon diode 11 is rendered conductive by the charge on capacitor 24. Capacitor 24 commences to discharge gradually through the diode 11 and discharge circuit 25 until the potential on capacitor 24 is reduced to a level which may be referred to as the diode stabilizing potential level, which level is substantially the smallest potential at which the diode will ignite, were the potential applied for a prolonged time period, for example, approximately two or three minutes. The process of discharging capacitor 24 to the stabilization potential level is gradual and takes place over a number of relaxation cycles inasmuch as when the diode ignites, a charge builds up on capacitor 27 which continues to build up until the difference between the potentials on capacitors 24 and 27 is reduced to the de-ionization, or extinguishing, potential level of the diode, whereupon the diode ceases to conduct and opens the discharge circuit path of capacitor 24. The charge on capacitor 27 leaks off through resistor 28 and the diode 11 again ignites. Since capacitor 27 is much smaller than capacitor 24, i.e. approximately 200 mmfds. and 1 mfd. respectively, this charging and discharging of capacitor 27 or stabilization process is repetitious since the potential on capacitor 24 is only reduced slightly every time capacitor 27 is charged. If this process is allowed to continue for a sufficient period of time, the potential on capacitor 24 eventually will be reduced to a level where even though capacitor 27 is completely discharged through resistor 28, the potential remaining on capacitor 24 is able to ignite the diode only if applied to it for a prolonged period of time, which potential, it will be recalled, is the stabilizing potential level of the diode under test. After the charge on capacitor 24 has been reduced to the stabilization potential level, the ganged switches are moved to position 3 whereupon the counting operation of counter 21 is commenced by an initiating potential from battery 16. If the switching operation had been performed while the diode was still conducting, the circuit interruption resulting from the movement of the non-shorting type of selector switches would have caused the diode to cease conducting. In addition, operation of the switches to position 3 completes a charging circuit through resistor 23 from battery 15 to capacitor 24 which increases the potential on capacitor 24 from the stabilization potential level to a level at which the diode will again ignite at a rate or gradient determinable by the equation:

$$\frac{dv}{dt} = \frac{V_B - BV_S}{RC}$$

wherein;

$\frac{dv}{dt}$ = voltage gradient.

$V_B$ = voltage of battery 15.
$BV_S$ = stabilizing voltage on capacitor 24.
$R$ = utilized resistance of resistor 23.
$C$ = capacitance of capacitor 24.

When diode 11 again ignites, or fires, a voltage is developed across resistor 26 which serves to stop the time counting operation of timer 21. The time indicated on the counter 21 is the ignition, or breakdown voltage, delay time T of the diode under test for the particular voltage gradient of the applied voltage, as computed by the foregoing equation. This operation may be repeated for different voltage gradients by successively changing variable resistor 23.

In order to compute the incremental variations in diode breakdown potentials, ΔBV, resulting from variations in the voltage gradient of the applied voltage, the ignition delay time T, indicated on the counter is multiplied by the computed voltage gradient, or $$\Delta BV = T\frac{dv}{dt}$$

The circuit shown on Fig. 2, generally indicated by the numeral 31, illustrates an alternative electric testing circuit for measuring incremental variations in ignition delay time of a gas diode 11 resulting from the application of divers potentials having zero-voltage gradients. As shown thereon, test circuit 31 includes a plurality of suitable direct current power sources, represented by the batteries 32, 33 and 34, a plurality of non-shorting type multiple position selector switches 35, 36 and 37, ganged for mechanical movement in unison, a conventional type of low-voltage voltmeter 38, such as a Keithley voltmeter and a conventional timer, or counter 21. The wiper arm of selector switch 35 is connected to input terminal 39 and fixed capacitor 41 through resistor 42. Input terminal 43 is connected to the wiper arm of switch 36. Stabilizing or discharge circuit 44 employing parallel connected capacitor 45 and resistor 46 is connected to contact 2 of selector switch 36 while contact 3 has connected thereto the variable terminal of potentiometer 47. As in test circuit 14, capacitor 45 is much smaller than capacitor 41, i.e. approximately 100 mmfd. and 2 mfd. respectively. One fixed terminal of potentiometer 47 is connected to the negative terminal of battery 33 while the other fixed terminal is so connected to the timer 21 as to stop the counting operation thereof in response to the firing of the diode 11 when the switches are in position 3. Potentiometer 47, battery 33 and meter 38 may be considered to comprise a diode initiating and timer deactuating circuit. Battery 34 is connected to the wiper contact of switch 37 and is capable of initiating the counting operation of counter 21 when switch 37 is moved to position 3.

The operation of breakdown voltage test circuit 31 is as follows. Initially the ganged selector switches are in position 1 whereby capacitor 41 quickly charges to the potential of battery 32 through resistor 42. The ganged switches are now moved to position 2 whereupon the diode 11 fires and by reason of the action of discharge circuit 44, as previously described for discharge circuit 25, the charge on capacitor 41 is gradually reduced. As previously mentioned, this action is allowed to continue for a predetermined time period until the potential on capacitor 41 is reduced to the stabilization potential level for the particular diode under test. The ganged switches are now operated to position 3 whereupon the counting operation of timer 21 is commenced. In addition, a preselected incremental negative voltage developed across a portion of potentiometer 47 and indicated by voltmeter 38 is applied to the cathode electrode of diode 11 thereby in effect raising the potential across the diode above the stabilization potential level charge remaining on capacitor 41. Upon the subsequent firing of the diode, a suitable voltage is developed across potentiometer 47 to terminate the timer counter operation. It therefore is apparent that repetition of this procedure utilizing additional incremental voltages will result in the obtainment of accurate measurements of the variations in diode ignition potential delay time for incremental changes in the level of the applied potential having a zero-voltage gradient.

It has been found that a straight line curve of ignition delay time versus the voltage gradient of the applied potential is obtainable when these values are plotted on double logarithmic graph paper. In addition, plotting of the relationship between ignition delay time and zero-voltage gradient applied potentials on double logarithmic paper resulted in a curve having a straight line relationship.

In order to derive the maximum degree of measurement accuracy, obtainable by the disclosed test circuits, it has been found desirable to utilize capacitors having low leakage and dielectric characteristics, such as polystyrene insulated capacitors, and standardization of the time periods allowed for the stabilization processes. Stabilization periods lasting approximately three minutes have resulted in the greatest degree of accuracies, however stabilizing periods of one to three seconds were found to result in satisfactory measurements.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Electrical apparatus for indicating the ignition characteristics of a gas tube under test comprising potential energy storage means for impressing potential energy across the gas tube under test sufficient to render the tube initially conductive, first circuit means for controlling the discharge of said energy storage means through the gas tube to a particular potential energy level at which the gas tube is rendered nonconductive, second circuit means for increasing the potential energy level across the gas tube when in the nonconductive condition under control of said first circuit means to an energy level sufficient to render the gas tube conductive, and means for indicating the time interval between the application of the increased potential energy level and the conductive rendition of the gas tube.

2. Testing apparatus for measuring the ignition characteristics of a gas tube under test comprising the gas tube under test including terminals thereon, first circuit means for impressing an ionizing potential across the terminals of the gas tube thereby rendering the gas tube initially conductive, second circuit means for effecting gradual reduction of the ionizing potential to a particular potential level at which the gas tube is rendered nonconductive, third circuit means for effectively increasing the potential across the terminals of the gas tube from said particular potential level to a level sufficient to render the gas tube conductive, and electroresponsive means for accurately measuring the time period between the application of the increased potential and the conductive rendition of the gas tube.

3. A test circuit for measuring the breakdown characteristics of a gas tube under test comprising a plurality of electrical contacts each for individual connection to each of the electrodes of the gas tube under test, a capacitor connected to one of said contacts, multiple position circuit switching means connected to each of said contacts, a unidirectional potential energy charging circuit, said charging circuit being connected to said capacitor when said switching means is in a first position for effecting charging of said capacitor to a preselected energy level, a discharge network including a parallel connected impedance and energy storage device, said network being connected to the other of said contacts when said switching means is in a second position for effecting a prolonged discharge of said capacitor through the gas tube until the potential energy across said contacts is reduced to a level rendering the gas tube nonconductive, circuit means for selectively increasing the potential energy across said contacts when said switching means is in a third position until the gas tube is rendered conductive, and electroresponsive means connected to said other contact when said switching means is in said third position for measuring the time interval between the application of the increased potential energy and the conductive rendition of the gas tube.

4. A test circuit according to claim 3 wherein said electroresponsive means includes an electronic counter having start and stop terminals, an unidirectional potential source, circuit switching means for effecting impression of the potential of said source upon the start terminal of said counter, and circuit means for impressing a signal indicative of gas tube conduction upon the stop terminal of said counter.

5. A test circuit according to claim 3 wherein said circuit means comprises a second unidirectional potential energy charging circuit connected across said capacitor for selectively increasing the level of the charge thereon.

6. A test circuit according to claim 3 wherein said circuit means comprises a negative biasing circuit including a unidirectional potential source and a variable impedance for impressing a preselected negative potential on said other contact thereby effectively increasing the potential energy across said contacts and the gas tube.

7. An electric circuit for measuring the ignition characteristics of a gas diode under test comprising plate and cathode contact terminals for individual connection to the plate and cathode electrodes of the gas diode under test, a capacitor connected to said plate terminal, a plurality of multiple position electrical switches mechanically gauged for conjoint movement, a first and second of said switches being individually connected to each of said contact terminals, a first potential energy source, a first impedance connected between said source and said first switch for effecting charging of said capacitor to an energy level sufficient to render the gas diode conductive when said switches are in a first position, a stabilizing network including a parallel coupled impedance and energy storage device connected between said first source and a second of said switches, said network being effective when said switches are in a second position to selectively discharge said capacitor through the gas diode until the charge remaining on said capacitor is reduced to a level at which the gas diode is rendered nonconductive, a second impedance connected between said source and said first switch for effecting recharging of said capacitor at a particular rate until the gas diode is rendered ignited when said switches are in the third position, an electronic timer having electroresponsive start and stop terminals, a second potential energy source connected to a third of said switches, said source being operatively coupled to said start terminal for actuating said timer when said switches are in said third position, and circuit means coupled to said stop terminal and to said second switch for deactuating said timer when said gas diode is rendered ignited.

8. An electric circuit for measuring the ignition characteristics of a gas diode under test comprising plate and cathode contact terminals for individual connection to the plate and cathode electrodes of the gas tube under test, a plurality of multiple position electrical switches mechanically gauged for movement in unison, a first and second of said switches being individually connected to each of said contact terminals, a first potential energy source, an impedance connected between said plate terminal and said first switch, a capacitor connected to said plate terminal and being connectable across said source and impedance, when said switches are in a first position thereby to be charged to an energy level sufficient to render the gas diode conductive, a stabilizing network including a parallel coupled impedance and energy storage device connected between said source and a second of said switches, said network being effective when said switches are in a second position to selectively discharge said capacitor through the gas diode until the charge remaining on said capacitor is reduced to a level at which the gas tube is rendered nonconductive, a biasing potential source connected to said second switch for effectively increasing the potential across said contact terminals when said switches are in a third position to ignite the gas tube, an electronic timer having electroresponsive start and stop terminals, a second potential energy source connected to a third of said switches said source being operatively coupled to said start terminal for actuating said timer when said switches are in said third position, and circuit means interconnecting said stop terminal and said second switch for deactuating said timer when said gas tube is rendered ignited.

9. Electrical apparatus for determining the ignition characteristics of gaseous electron discharge devices comprising means for effecting electron flow in the electron discharge path of a gaseous electron discharge device under test, means for controlling said electron flow to establish a first predetermined condition of conductivity in said electron discharge path, means operable after establishment of said first condition to vary the condition of conductivity in said path to a second condition, and means for measuring the time interval between said first and second conditions.

References Cited in the file of this patent
UNITED STATES PATENTS

| 2,545,541 | Blair | Mar. 20, 1951 |
| 2,761,104 | Morris | Aug. 28, 1956 |

OTHER REFERENCES

Heymann: "Breakdown in Cold-Cathode Tubes at Low Pressure," Physical Society of London Proceedings, vol. 63 B, pages 25–41 (pages 29–30 specifically relied on).